United States Patent [19]

Lundberg et al.

[11] 4,160,872
[45] Jul. 10, 1979

[54] SELF-FLOATING CABLE FOR MARINE OPERATIONS

[75] Inventors: Bo E. O. Lundberg, Sundbyberg; Victor Scuka, Upplands-Bälinge, both of Sweden

[73] Assignee: Telefonaktiebolaget L M Ericsson, Stockholm, Sweden

[21] Appl. No.: 823,288

[22] Filed: Aug. 10, 1977

[30] Foreign Application Priority Data

Aug. 24, 1976 [SE] Sweden .................................. 7609347

[51] Int. Cl.² .................. H01B 7/12; H01B 7/18; G02B 5/14
[52] U.S. Cl. .................. 174/101.5; 174/70 A; 174/109; 174/115; 350/96.23
[58] Field of Search ............ 174/115, 70 R, 70 A, 174/101.5, 108, 109; 350/96.23

[56] References Cited

U.S. PATENT DOCUMENTS

| | | | |
|---|---|---|---|
| 3,297,814 | 1/1967 | McClean | 174/115 |
| 3,324,233 | 6/1967 | Bryant | 174/69 |
| 3,610,808 | 11/1968 | Horwinski | 174/115 |
| 4,038,489 | 7/1977 | Stenson et al. | 174/70 R |

FOREIGN PATENT DOCUMENTS

| | | | |
|---|---|---|---|
| 630746 | 5/1936 | Fed. Rep. of Germany | 174/70 A |
| 970519 | 9/1964 | United Kingdom | 174/108 |
| 1229787 | 8/1971 | United Kingdom | 174/70 A |

OTHER PUBLICATIONS

"Principles of Fiber Optical Cable Design," article by SG Foord, p. 601.

*Primary Examiner*—Laramie E. Askin
*Assistant Examiner*—E. F. Borchelt
*Attorney, Agent, or Firm*—Hane, Roberts, Spiecens & Cohen

[57] ABSTRACT

An electrical cable of the self-floating type for use in marine environments is provided with elements for taking up mechanical tractive forces. The electrical conductors of the cable are surrounded by an inner friction layer with a low friction coefficient. Around this layer a force equalizing layer of metallic material is provided and this layer is surrounded by hollow strands of soft plastic material. An outer friction layer of the same material as the inner friction layer surrounds the hollow strands and the whole system together with the elements for taking up the tractive forces is embedded in a cable mantle of rubber-like plastic material.

1 Claim, 2 Drawing Figures

SELF-FLOATING CABLE FOR MARINE OPERATIONS

FIELD OF THE INVENTION

The present invention relates to a cable for transferring electrical power or electrical signals which is of the floatation type and provided with special elements for taking up mechanical loads. The cable is intended to be used at specially severe operations, preferably, in connection with mobile marine installations. The cable according to the invention meets the high demands put on the operation security and the mechanical strength and is easy to handle in all types of marine environments.

BACKGROUND

When transferring electrical power or electrical signals between marine craft above and below the water surface it is desirable to use a transferring means of the self-floating type. Such a cable is, however, subject to bending forces perpendicular to its longitudinal direction due to the influence of the waves. This can lead to fatigue in previously known cable constructions and specially signal cables. Further complications when working with cables in marine environments are the forces which the cable will be subject to due to the influence of water streams. The cable according to the present invention is constructed with a special cross sectional profile and with elements for taking up loads in order to obviate these inconveniences. Known cables with elements for taking up pulling forces, are manufactured of metal- or plastic cords, the purpose of the cords being to take up the pulling forces of the cable.

SUMMARY OF THE INVENTION

In the cable according to the present invention the function of the element taking up the pulling forces has been increased and the main purpose is, in combination with the floating property of the cable, to take up all types of mechanical loads in the longitudinal as well as in the transverse direction. This has been achieved primarily by proper choice of material combinations for the different elements in the cable and by providing layers having very low friction coefficient at the cable mantle and at the inner conductors of the cable. Furthermore, the sensitivity for strokes or similar mechanical outer influence has been essentially reduced by providing the cable with pressure equalizing elements.

An object of the present invention is to provide a self-floating cable for transferring electrical power of electrical signals which endures high dynamic pulling and bending forces, whereby the cable is not subject to fatigue in handling as well as when influenced by waves and water streams.

Another object is to provide a cable having the above mentioned properties also at relatively low temperatures (down to $-10°$ C.).

BRIEF DESCRIPTION OF THE DRAWINGS

The invention, the characteristics of which appear from the following claims, will be described more in detail with reference to the accompanying drawing, where

DETAILED DESCRIPTION

Figure 1:
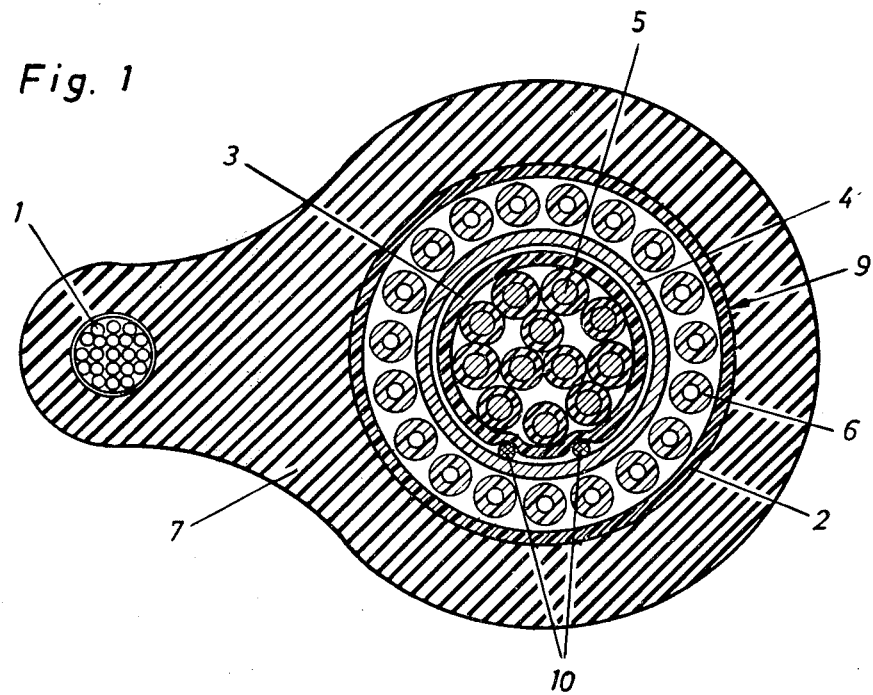
FIG. 1 is a cross section of the cable according to the invention in which the part which transfers the electrical energy is shown in detail.

The cable according to FIG. 1 consists of two separate systems 1 and 9 which are movable in the longitudinal direction of the cable relative to the cable mantle 7. The mantle 7 consists of a rubber-like gas-tight plastic material. One system 9 transfers the electric energy or electrical and/or optical signals, while the other system 1 is intended for mechanical reinforcement of the cable. Alternatively, the other system can be utilized for transferring liquid or gas, but in the embodiment of the inventive cable shown here, system 1 is intended only to take up mechanical forces on the cable.

The conductor system in the cable which transfers electrical energy consists of insulated plural wire or coaxial twisted inner conductors 5 which are tightly packed together. Around the conductors 5 an inner friction layer is wound in the form of a band 3 of plastic material, for example, Mylar. Above the band 3 a force equalizing layer 4 is wound which consists of metallic material, for example, surface treated aluminum (so called Al-PS foil). The two bands 3 and 4 are wound with certain overlap, the overlapping and the overlapped parts of the band 3 easily being able to slip relative to each other.

The force equalizing layer (metal sheet 4) has the purpose of taking up pointwise outer forces on the cable mantle and to reduce the influence of the pressure caused which approaches the conductors 5 by distributing these outer forces across a larger area. The stiffness of the layer can be reduced by, as mentioned above, winding the metal strip with certain overlap, a low friction between overlapping and overlapped strip parts being obtained by influence of the treated metal surface. By providing non-insulated plural-wire conductors 10 between the layers 3 and 4, the metal layer 4 can also be used as an efficient protective conductor and as an electrical screen for the inner conductors 5.

Figure 2:
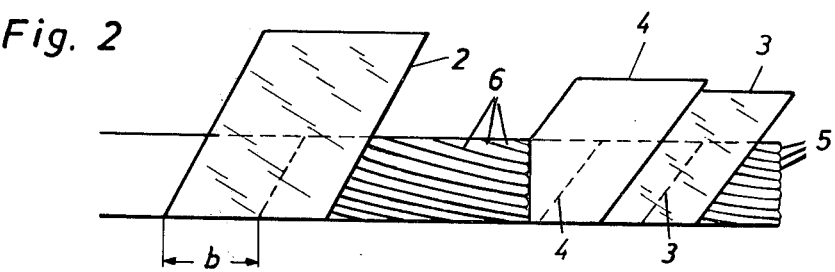
FIG. 2 shows the cable according to the invention with removed cable mantle.

Above the force equalizing layer (metal sheet 4) a force absorbing layer is provided which consists of a great number of hollow cords 6 of soft plastic material, for example, foam-polyethylene. As appears from FIG. 2, the cords are disposed around the force-equalizing layer 4 with a certain pitch in the longitudinal direction of the cable. Above the cords 6 a further friction layer is disposed which consists of the same material as the inner friction layer 3. The further friction layer 2 consists of thin strips which have a low friction coefficient when contacting its own surface and, therefore, are wound with great overlap around the force absorbing layer (cords 6). The purpose of these thin strips is primarily to enable a longitudinal movement of the system 9 relative to the cable mantle 7. The overlap of the layers is indicated by dotted lines in FIG. 2.

The width b of the overlap of the outer friction layer 2 is suitably chosen somewhat greater than half the width of the strip.

The conductor system 1 is intended to absorb mechanical forces in the longitudinal and the transverse direction of the cable. The system contains a number of cords of mechanically stable plastic material, for example, "phyllistran". The cords are preferably twisted around each other but not rigidly moulded to the mantle. Hereby the system 1 will at pull stresses slip in relation to the cable mantle, whereby the electric system 9 will not be subject to large pull forces in the longitudinal direction of the cable. The conductor system can, as mentioned above, be designed as a liquid or gas transferring channel comprising fibre-reinforced plastic material with high mechanical strength.

We claim:

1. Self-floating cable with high flexibility, comprising two separate conductor systems, one of said systems transferring electric energy and the other system resisting mechanical loads applied longitudinally and transversely to the cable; a common cable mantle surrounding said two systems, said one system including an inner friction layer of plastic material having a low friction coefficient when contacting its own surface and surrounding inner conductors of the electric conductor system, said inner friction layer being wound about itself to form overlapped and overlapping portions; a metallic layer covering said friction layer, said metallic layer also being wound about itself to form overlapped and overlapping portions; a number of hollow cords of soft plastic material disposed in parallel and surrounding said metallic layer, said cords extending with a pitch along the longitudinal direction of the cable; and an outer friction layer of plastic material with a low friction coefficient when contacting its own surface, said outer friction layer covering said cords and being surrounded by the cable mantel and being wound about itself to form overlapped and overlapping portions, the low friction coefficient of said outer friction layer being such as to enable longitudinal movement of the said one system relative to said cable mantle, the low friction coefficient of said inner friction layer enabling relative longitudinal movement of the inner conductors and the remainder of the said one system.

* * * * *